United States Patent
Umetsu et al.

(10) Patent No.: US 6,216,734 B1
(45) Date of Patent: Apr. 17, 2001

(54) ROTARY DEVICE SUPPORT STRUCTURE FOR FUEL SUPPLY APPARATUS

(75) Inventors: Kunihiro Umetsu, Anjo; Masaaki Tanaka, Tsu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/501,574

(22) Filed: Feb. 10, 2000

(30) Foreign Application Priority Data

Feb. 18, 1999 (JP) .................................................. 11-040509

(51) Int. Cl.⁷ .................................................. F04B 17/00
(52) U.S. Cl. .................. 137/565.24; 137/565; 417/363; 123/509
(58) Field of Search ........................ 417/363; 137/565.24, 137/565; 123/509

(56) References Cited

U.S. PATENT DOCUMENTS

| 4,362,476 | * | 12/1982 | Kemmner et al. | 417/360 |
| 4,569,637 | * | 2/1986 | Tuckey | 417/360 |
| 4,591,319 | * | 5/1986 | Takahashi et al. | 417/360 |
| 4,768,925 | * | 9/1988 | Geupel | 415/213.1 |
| 4,780,063 | * | 10/1988 | Tuckey | 417/360 |
| 5,044,526 | * | 9/1991 | Sasaki et al. | 222/377 |

FOREIGN PATENT DOCUMENTS 61-76117    5/1986   (JP) .

* cited by examiner

*Primary Examiner*—A. Michael Chambers
*Assistant Examiner*—Thomas L. McShane
(74) *Attorney, Agent, or Firm*—Nixon & Vanderhye P.C.

(57) ABSTRACT

In a fuel supply apparatus for vehicles, a fuel pump is supported in a sub tank through cushioning members. Each cushioning member includes a plurality of resilient parts having a wavy shape in cross section in a radial direction and a plate width in an axial direction. The resilient parts thus support the fuel pump resiliently to absorb vibrations of the fuel pump caused in the radial direction, while withstanding the weight of the fuel pump and the reaction force generated upon fuel discharge operation of the fuel pump. The cushioning members are resin-molded unitarily with an inlet-side cover and an outlet-side cover which are fitted in the axial side ends of the fuel pump. The cushioning members have respective engagement parts which are fitted with the sub tank. The sub tank has stoppers which restrict the fuel pump from moving in the axial direction under a condition that the fuel pump is assembled with the sub tank.

18 Claims, 3 Drawing Sheets

ROTARY DEVICE SUPPORT STRUCTURE FOR FUEL SUPPLY APPARATUS

CROSS REFERENCE TO RELATED APPLICATION

This application relates to and incorporates herein by reference Japanese Patent Application No. 11-40509 filed on Feb. 18, 1999.

BACKGROUND OF THE INVENTION

The present invention relates to a structure for supporting a rotary device for a fuel supply apparatus.

A fuel pump for supplying an internal combustion engine with fuel is installed within a fuel tank of a vehicle or a sub tank accommodated within the fuel tank. The fuel pump comprises a mechanical pump unit and an electromagnetic drive unit (electric motor) for driving the pump unit. The fuel pump is supported in various ways within the sub tank or the fuel tank. For instance, it is supported in such a manner that its axis extends vertically, inclinedly or horizontally.

The electric motor generates vibrations during its rotation, and its first-order and higher-order components of the frequency of rotation cause vibrations of the sub tank or the side walls or bottom wall of a casing, thus generating noise sounds. Therefore, a rubber cushion member made of an oil-resistive rubber material is interposed between the outer peripheral surface of the fuel pump and the bottom wall of the casing. The rubber cushioning member must be rigid or high density-type to some extent to maintain its shape against the weight of the fuel pump and the reaction force of the same generated in response to the fuel discharge operation. As a result, the vibrations cannot be reduced sufficiently.

It is proposed to support the fuel pump from the side wall of the sub tank or the casing while interposing the rubber cushioning member between the outer peripheral surface of the fuel pump and the bottom wall. The side wall of the sub tank or the casing vibrates largely in a direction perpendicular to the side walls, because the vibration absorbing performance of the rubber cushioning member is limited due to its rigid or high density-type construction. Further, the assembling work for fixing the fuel pump to the side wall through the rubber cushioning member is complicated, because the rubber cushioning member must be fixed to both of the fuel pump and the side wall.

SUMMARY OF THE INVENTION

It is therefore an object of the present invention to provide a rotary device support structure for a fuel supply apparatus using the same structure which provides an excellent vibration restriction performance is less assembling work and cost.

According to the present invention, a cushioning member disposed between a rotary device and a casing has a plurality of resilient parts. Each resilient part has a plate width in the axial direction of the rotary device and a wavy shape in cross section in the radial direction of the rotary device. Adjacent two of the resilient parts are connected with an engagement part. The cushioning member is resin-molded integrally with a part of a cover of the fuel pump. The rotary device is assembled with the casing in reduced assembling work by fitting the engagement parts with the casing from the top opening of the casing. The cushioning member resiliently supports the rotary device in the casing to absorb vibrations from the fuel pump, while withstanding the weight of the rotary device and the reaction force generated when the rotary device operates.

BRIEF DESCRIPTION OF THE DRAWINGS

The above object, features and advantages of the present invention will become more apparent from the following detailed description made with reference to the accompanying drawings.

In the drawings.

DETAILED DESCRIPTION OF THE PREFERRED EMBODIMENT

Figure 1:
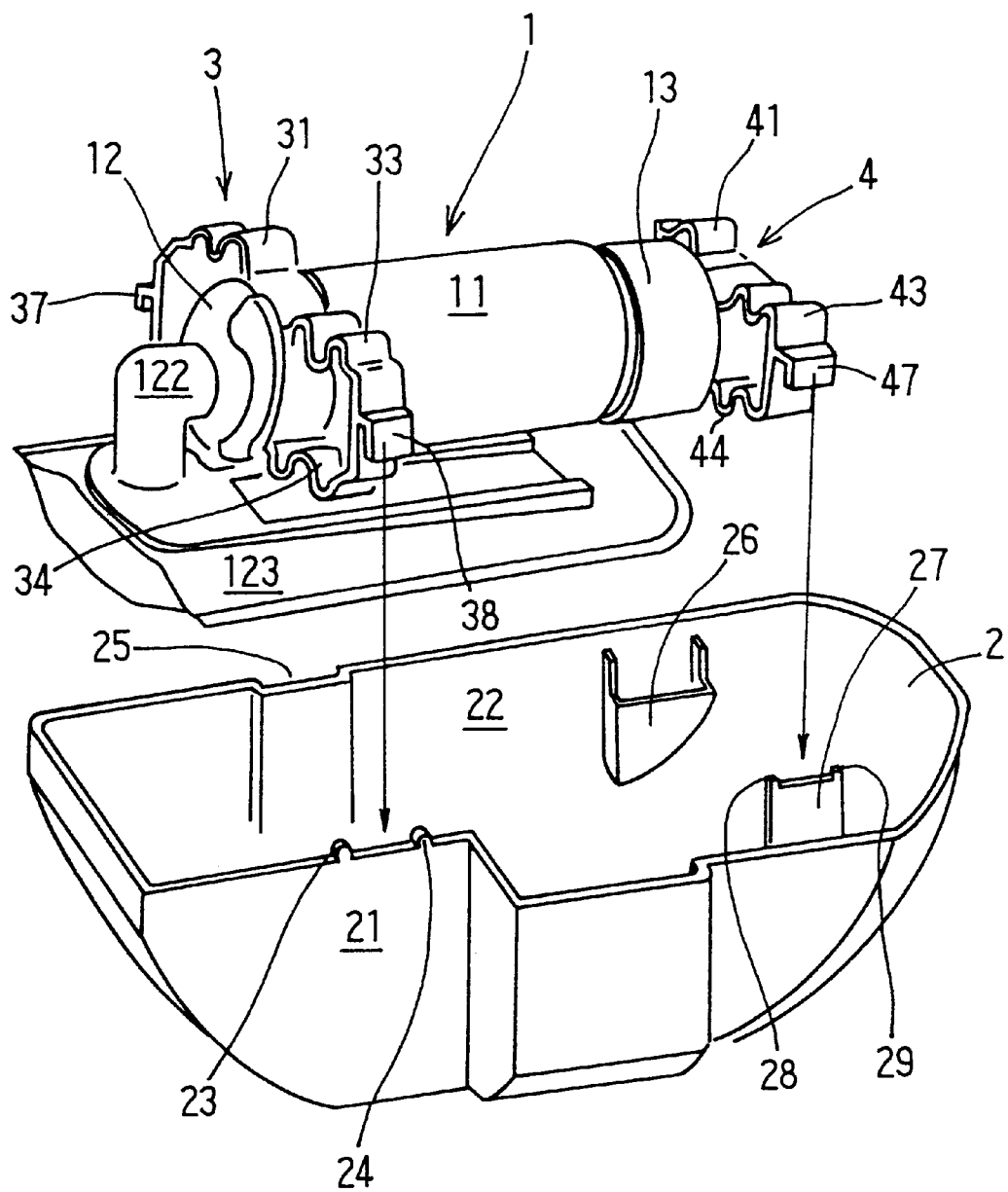
FIG. 1 is an exploded perspective view showing a fuel supply apparatus according to an embodiment of the present invention.

A fuel supply apparatus according to the present invention is shown in FIG. 1. The apparatus is designed to be installed within a fuel tank of a vehicle (not shown) and to supply fuel to an internal combustion engine (not shown). The apparatus comprises a fuel pump 1 which is a rotary device, a sub tank or casing 2, and a pair of cushioning members 3 and 4. Each of the cushioning members 3 and 4 is interposed between the fuel pump 1 and the sub tank 2.

Figure 2:
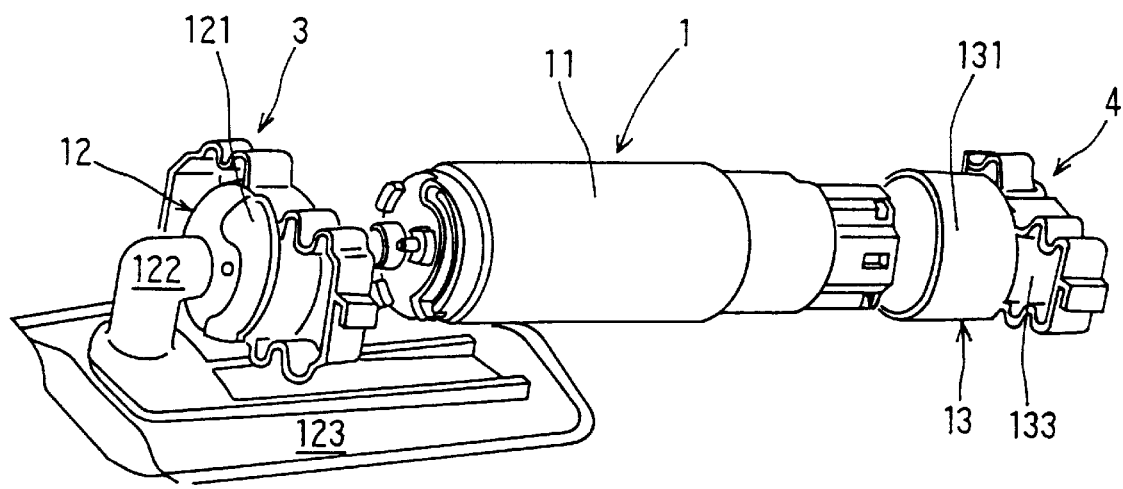
FIG. 2 is an exploded perspective view showing a fuel pump shown in FIG. 1.
Figure 3:
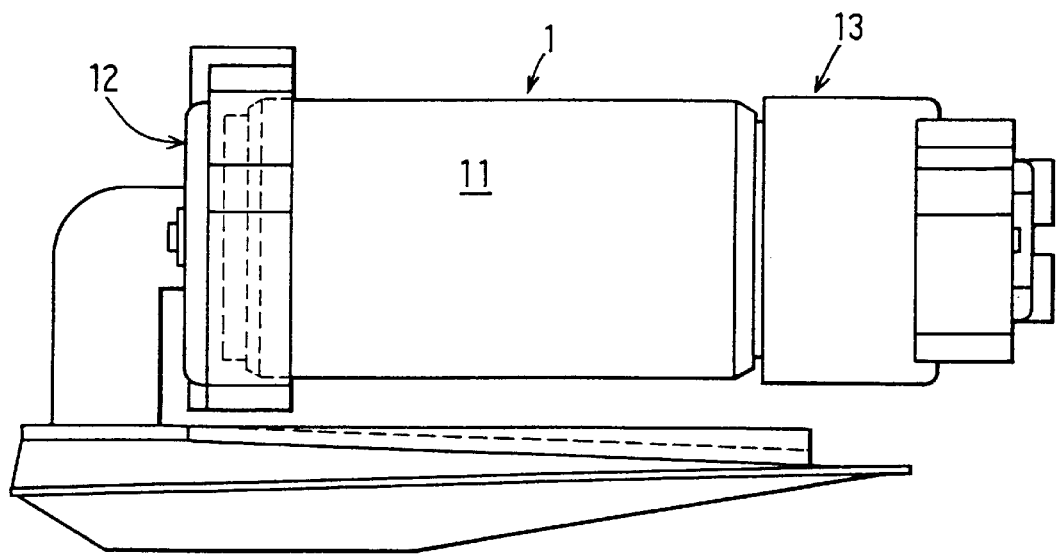
FIG. 3 is a front view showing the fuel pump shown in FIG. 2.

As shown in FIGS. 2 and 3, the fuel pump 1 comprises a cylindrical housing 11 encasing therein a mechanical pump unit (not shown) and an electromagnetic drive unit (electric motor, not shown), an inlet-side fitting member or cover 12 fitted in the inlet-side end of the body 11, and an outlet-side fitting member or cover 13 fitted in the outlet-side end of the body 11. The cushioning member 3 and the cover 12 are made of a resin material and unitarily molded. The cushioning member 4 and the cover 13 are made of a resin material and unitarily molded.

The sub tank 2 is, as shown in FIG. 1, in a box-like shape having an opening at its top so that the fuel pump 1 is laid in a horizontal direction. The sub tank 2 has a pair of generally parallel side walls 21 and 22 and extends in a manner to sandwich the fuel pump 1 therebetween.

Figure 4:
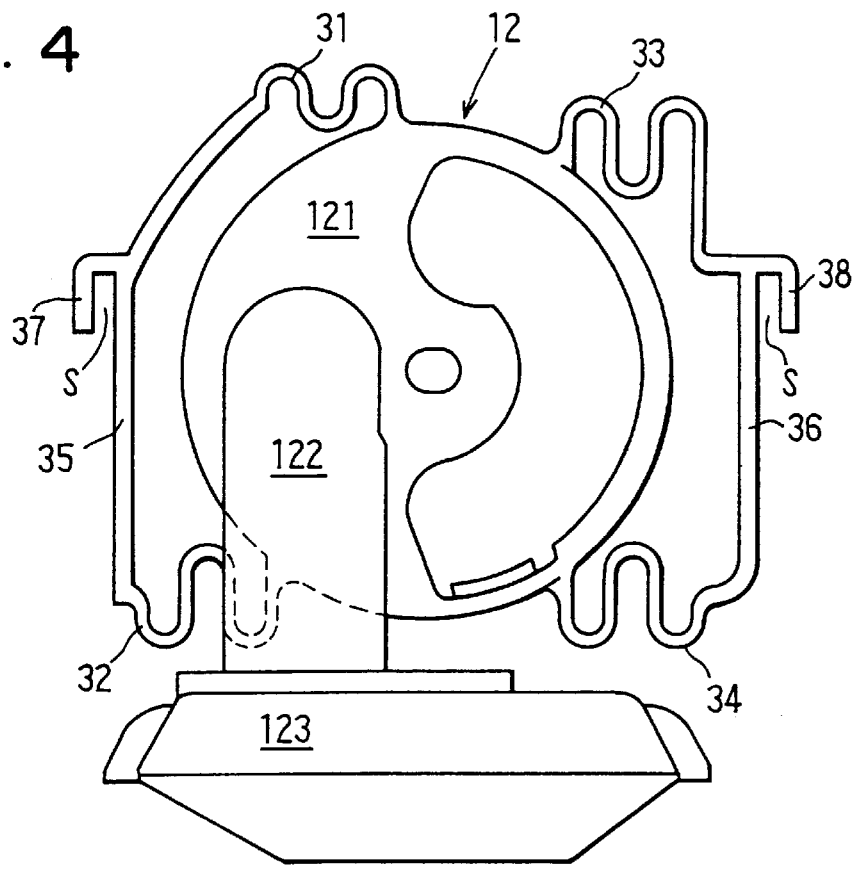
FIG. 4 is a side view showing an inlet-side fitting member of the fuel pump shown in FIGS. 1 and 2.

The inlet-side cover 12 has, as shown in detail in FIG. 4, a generally cup-shaped base 121, an inlet pipe 122, and a guide plate 123. The base 121 is fitted in the inlet-side end of the body 11 and encases therein a fuel strainer (not shown) for straining fuel entering into the pump unit of the fuel pump 1. The inlet pipe 122 is shaped to extend outwardly in the axial direction of the fuel pump 1 from the base 121 and in a radial direction, that is, in a downward direction in FIGS. 1 and 4. The guide plate 123 is shaped to extend from the bottom end of the inlet pipe 122. The guide plate 123 is slightly inclined from the horizontal plane. The guide plate 123 is for guiding fuel vapor arising in the sub tank 2 to the inlet pipe 122, and is placed on the bottom of the sub tank 2.

The inlet-side cushioning member 3 has a plurality of wavy resilient parts 31 to 34, plate-like side engagement parts 35 and 36, and nail parts 37 and 38. The cushioning member 3 extends integrally from the base 121 of the cover 12. That is, the cover 12 of the fuel pump 1 fixes the cushioning member 3 to the fuel pump 1. Each of the resilient parts 31 to 34 has a wavy cross section which meanders radially outwardly from the base 121. It is preferred that the resilient parts 31 to 34 have different lengths and thickness and connected to the base 121 at positions asymmetric to each other in the direction of motor rotation.

The side engagement part 35 is shaped to connect ends of the resilient parts 31 and 32 in a vertical direction. Similarly, the side engagement part 36 is shaped to connect ends of the resilient parts 33 and 34 in a vertical direction. The nail part 37 is shaped to extend from the engagement part 35 in L-shape and in parallel with the engagement part 35, while leaving a space S relative to the engagement part 35. Similarly, the nail part 38 is shaped to extend from the engagement part 36 in L-shape and in parallel with the engagement part 36, while leaving a space S relative to the engagement part 36. Thus, the resilient parts 31, 32 and the side engagement part 35 is generally shaped in a C-shape, and the resilient parts 33, 34 and the side engagement part 36 is generally shaped in a C-shape.

Figure 5:
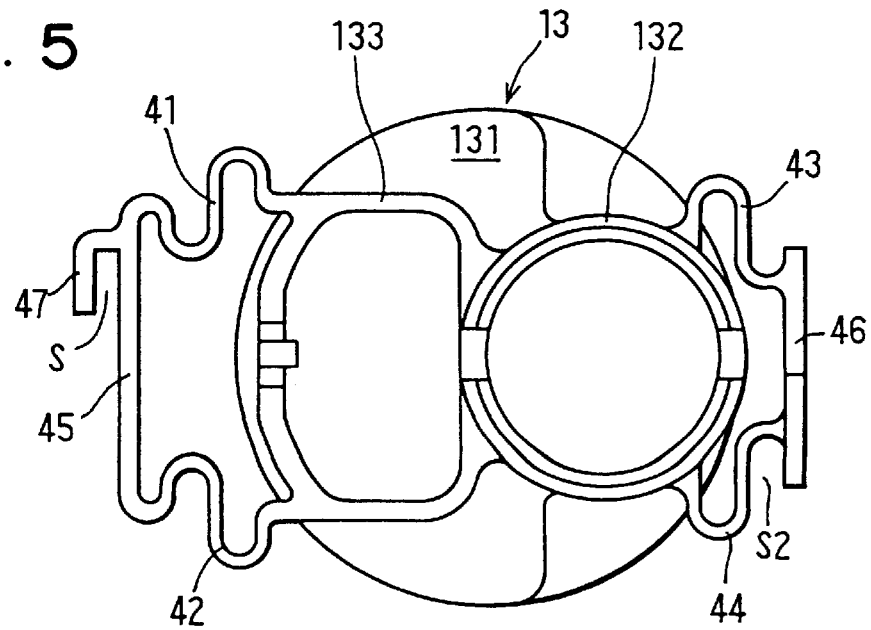
FIG. 5 is a side view showing an outlet-side fitting member of the fuel pump shown in FIGS. 1 and 2.

The outlet-side cover 13 has, as shown in detail in FIG. 5, a generally cup-shaped base 131, an outlet cylindrical tube 132 and a connector housing 133. The base 131 is fitted in the outlet-side end of the body 11. The cylindrical tube 132 and the connector housing 133 are shaped to extend outwardly in an axial direction from the base 131 in parallel to each other. A fuel outlet pipe (not shown) is fitted in the cylindrical tube 132 to discharge the pressurized fuel to the outside of the fuel tank. The connector housing 133 has electrical terminal pins therein for supplying electric power for driving the motor.

The outlet-side cushioning member 4 has a plurality of wavy resilient parts 41 to 44, plate-like side engagement parts 45 and 46, and a nail part 47. The cushioning member 4 extends integrally from the base 131 of the cover 13. That is, the cover 13 of the fuel pump 1 fixes the cushioning member 4 to the fuel pump 1. Each of the resilient parts 41 to 44 has a wavy cross section which meanders in radially outwardly from the base 131. The cushioning member 4 extends in the axial direction in parallel with the cylindrical tube 132 and the connector housing 133. It is preferred that the resilient parts 41 to 44 have different lengths and thickness and connected to the base 121 at positions asymmetric to each other in the direction of motor rotation.

The side engagement part 45 is shaped to connect ends of the resilient parts 41 and 42 in a vertical direction. Similarly, the side engagement part 46 is shaped to connect ends of the resilient parts 43 and 44 in a vertical direction. The nail part 47 is shaped to extend from the engagement part 45 in L-shape and in parallel with the engagement part 45, while leaving a space S relative to the engagement part 45. A space S2 is provided between the engagement part 46 and the resilient part 44 so that no nail part is formed on the engagement part 46. Thus, the resilient parts 41, 42 and the side engagement part 45 is generally shaped in a C-shape, and the resilient parts 43, 44 and the side engagement part 46 is generally shaped in a C-shape.

Referring back to FIG. 1, the fuel pump 1 is placed in the sub tank 2 from the upper opening of the sub tank 2 in an assembling process. The sub tank 2 is shaped to have stoppers 23 and 24 on the top end of its side wall 21 to restrict the nail part 38 from moving in the axial direction under the assembled condition, that is, after the side wall 21 is fitted in the space S between the engagement part 36 and the nail part 38. The side wall 22 is partly recessed to provide a convexity or groove 25 to restrict the nail part 37 from moving in the axial direction under the assembled condition, that is, after the side wall 22 is fitted in the space S between the engagement part 35 and the nail part 37.

The side wall 22 is also shaped to have an engagement part 26 on its inner surface to restrict the side engagement part 46 from moving in the axial direction under the assembled condition, that is, after the engagement part 46 is fitted therein. The sub tank 2 has a plate-like independent column 27 which extends upward from the bottom of the sub tank 2. The column 27 has a cross section which is wide in the axial direction of the fuel pump 1 and thin in the lateral direction. The column 27 is shaped to have stoppers 38 and 29 at its top end to restrict the nail part 47 from moving in the axial direction under the assembled condition, that is, after the column 27 is fitted in the space S between the engagement part 45 and the nail part 47. Thus, the fuel pump 11 is fixedly supported within the sub tank 2 in a manner that its movement in the axial direction is restricted.

In operation of the fuel pump 1, the rotor of the motor and the impeller of the pump unit tends to causes vibrations of the fuel pump 1 in the radial direction. If the vibrations are transmitted to the sub tank 2, sound noises are generated at frequencies which corresponds to the first-order or higher-order components of the basic frequency varying with the rotation speed of the motor. According to the present embodiment,however, the fuel pump 1 is supported via pair of resilient parts 31 to 34 and 41 to 44 at both axial (front and rear) sides and both lateral (right and left) sides. Therefore, the resilient parts operate to resiliently deform thereby to restrict the vibrations of the fuel pump 1 in the radial directions from being transmitted to the sub tank 2, thus reducing the sound noises. In addition, the each of the resilient parts 31 to 34 and 41 to 44 have widths in the axial direction. Therefore, the resilient parts 31 to 34 and 41 to 44 can withstand the weight of the fuel pump 1 and the reaction force generated when the fuel pump 1 discharges pressurized fuel.

Further, the wavy resilient parts 31 to 34 and 41 to 44 have different shapes (thickness and length) from each other, and connected to the covers 12 and 13 at positions which are not symmetric in with respect to the direction of motor rotation. Therefore, the resonance frequency of the fuel pump 1 suspended from the side walls 21 and 22 through the resilient parts 31 to 34 and 41 to 44 can be increased so that it does not resonate in the range of normal motor rotation speed.

Still further, the number of component parts and the assembling work can be reduced, because the cushioning members 3 and 4 are resin-molded unitarily with the inlet-side cover 12 and the outlet-side cover 13 for the cylindrical housing 11, respectively.

The present invention should not be limited to the above embodiment, but may be implemented in many other ways without departing from the spirit of the invention. For instance, each of the resilient parts need not have turned parts but may be in a single curved shape.

What is claimed is:

1. A rotary device support structure comprising a rotary device having a housing for accommodating a rotary member therein; a casing accommodating the rotary device therein; and a cushioning member interposed between the rotary device and the casing, wherein the cushioning member is formed integrally with a part of the housing, and wherein the cushioning member includes
a base fixed to the housing,
a plurality of resilient parts extending from the base radially outwardly, and
a plurality of engagement parts formed at ends of the resilient parts for engagement with the casing, respectively.

2. A rotary device support structure of claim 1, wherein:
the cushioning member is resin-molded with the housing;
each of the resilient parts has at least one plate-like part extending in an axial direction and turned in wavy shape in cross section in a radial direction; and
each of the engagement parts is in a plate shape and connected to ends of circumferentially adjacent two of the resilient parts so that the cushioning member has a generally C-shaped cross section in the radial direction.

3. A rotary device support structure of claim 1, wherein:
the rotary device is disposed generally horizontally in the casing;
the cushioning member has a plurality of nail parts extending from the engagement parts in parallel therewith and spaced apart from the engagement parts; and
the casing is in a box-like shape having a top opening and has wall parts which is near the top opening and fitted in spaces between the engagement parts and the nail parts so that the rotary device is supported in the casing through the cushioning member.

4. A rotary device support structure of claim 3, wherein:
the casing has a column part resin-molded integrally and separately from the wall parts, and extending upright from a bottom of the casing, so that the column part is fitted in the space between the engagement part and the nail part.

5. A rotary device support structure of claim 1, wherein:
the base is in a cup-shape and fitted in axial ends of the housing.

6. A rotary device support structure of claim 1, wherein:
the rotary device includes a pump unit and a motor unit for driving the pump unit;
the base includes an inlet-side base and an outlet-side base;
the inlet-side base is in a cup-shape, fitted in an inlet-side end of the pump unit, and has a strainer for straining fuel; and
the outlet-side base is in a cup-shape, fitted in an outlet-side end of the pump unit, and has a cylindrical tube for discharging pressurized fuel therefrom.

7. A rotary device support structure of claim 1, wherein:
the resilient parts are shaped differently from each other or connected to the base at positions asymmetric to each other with respect to a rotation of the rotary member.

8. A rotary device support structure of claim 1, wherein:
the resilient parts are connected to extend from the base at vertically different positions and horizontally different positions.

9. A rotary device support structure of claim 1, wherein:
the rotary device is a fuel pump which discharges fuel in an axial direction thereof, and is encased in the casing generally horizontally; and
the casing has stoppers for restricting the fuel pump from moving in the axial direction under the condition that the casing is fitted with the engagement parts.

10. A rotary device support structure comprising a rotary device having a housing for accommodating a rotary member therein, a casing accommodating the rotary device therein, and a cushioning member interposed between the rotary device and the casing, wherein:
the cushioning member is formed integrally with a part of the housing;
the cushioning member includes a base fixed to the housing, a plurality of resilient parts extending from the base and having planes extending generally in an axial direction of the rotary device, and a plurality of plate-like engagement parts formed at ends of the resilient parts for engagement with the casing, respectively;
each of the engagement parts is connected to circumferentially adjacent two of the resilient parts to provide a C-shape structure in cross section in a radial direction of the rotary device;
the engagement parts has respective nail parts extending in a vertical direction at a radially outside of the engagement parts and spaced apart from the engagement parts; and
the casing has wall parts extending vertically and fitted in spaces between the engagement parts and the nail parts.

11. A fuel supply apparatus for vehicles comprising:
a fuel pump unit having an inlet side and an outlet side arranged in an axial direction;
an inlet-side cover fitted in the inlet side of the fuel pump;
an oulet-side cover fitted in the outlet side of the fuel pump;
an inlet-side cushioning member connected to the inlet-side cover and having a plurality of resilient parts arranged around a circumference of the inlet-side cover to extend radially outwardly;
an outlet-side cushioning member connected to the outlet-side cover and having a plurality of resilient parts arranged around a circumference of the outlet-side cover to extend radially outwardly; and
a casing having wall parts engaged with the resilient parts of the inlet-side cushioning member and the outlet-side cushioning member in a direction perpendicular to the axial direction thereby supporting the fuel pump unit therein in a direction perpendicular to the direction of engagement with the resilient parts, the wall parts having stoppers near locations of the engagement with the resilient parts to restrict the resilient parts from moving in the axial direction.

12. A fuel supply apparatus of claim 11, wherein:
each of the cushioning members has a plate-like engagement part connecting adjacent two of the resilient parts and fitted with the side wall; and
each of the resilient parts has a plate width in the axial direction and is constructed in a wavy shape.

13. A fuel supply apparatus of claim 12, wherein:
each of the cushioning members has a nail part extending from and in parallel with the engagement part to provide a space therebetween into which the wall parts of the casing is inserted.

14. A fuel supply apparatus of claim 11, wherein:
the inlet-side cover and the inlet-side cushioning member are resin-molded into a single unit; and
the outlet-side cover and the outlet-side cushioning member are resin-molded into a single unit.

15. A fuel supply apparatus of claim 11, wherein:
the resilient parts in each of the inlet-side cushioning member and the outlet-side cushioning member have different configurations from each other.

16. A fuel supply apparatus of claim 11, wherein:

the resilient parts in each of the inlet-side cushioning member and the outlet-side cushioning member are arranged asymmetrically around the circumference of the conver.

17. A fuel supply system of claim 16, wherein:

the resilient parts in each of the inlet-side cushioning member and the outlet-side cushioning member are arranged at both upper and lower locations on each of two lateral sides of the cover.

18. A fuel supply system of claim 11, wherein:

the casing has a top opening through which the fuel pump unit is inserted; and the wall parts extend upright in parallel with each other in the direction perpendicular to the axial direction.

* * * * *

UNITED STATES PATENT AND TRADEMARK OFFICE
CERTIFICATE OF CORRECTION

PATENT NO. : 6,216,734 B1  
DATED : April 17, 2001  
INVENTOR(S) : Umetsu et al

It is certified that error appears in the above-identified patent and that said Letters Patent is hereby corrected as shown below:

<u>Title page,</u>
Item [56], Foreign Patent Documents, the cited Japanese document should read -- 61-76177 --.

Signed and Sealed this

Eighteenth Day of September, 2001

*Attest:*

*Attesting Officer*

NICHOLAS P. GODICI  
*Acting Director of the United States Patent and Trademark Office*